United States Patent
Nishijima et al.

(10) Patent No.: US 8,024,093 B2
(45) Date of Patent: Sep. 20, 2011

(54) METHOD OF AND APPARATUS FOR ADJUSTING A MOTORCYCLE HEADLIGHT, AND MOTORCYCLE INCORPORATING SAME

(75) Inventors: Hiroshi Nishijima, Saitama (JP); Koji Suzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 143 days.

(21) Appl. No.: 12/322,583

(22) Filed: Feb. 4, 2009

(65) Prior Publication Data
US 2009/0248256 A1 Oct. 1, 2009

(30) Foreign Application Priority Data
Mar. 27, 2008 (JP) .................... 2008-084060

(51) Int. Cl.
*B60R 22/00* (2006.01)
*B60Q 1/00* (2006.01)
*F21V 7/04* (2006.01)

(52) U.S. Cl. ............... 701/49; 362/466; 362/552

(58) Field of Classification Search ........... 701/49; 362/72, 71, 66, 37, 418, 428, 271, 272, 286, 362/466, 552
See application file for complete search history.

(56) References Cited

U.S. PATENT DOCUMENTS

| 4,024,387 | A * | 5/1977 | Alphen .................. 362/468 |
| 4,075,469 | A * | 2/1978 | Alphen .................. 362/467 |
| 4,870,545 | A * | 9/1989 | Hatanaka et al. ........ 362/466 |
| 6,193,398 | B1 * | 2/2001 | Okuchi et al. .......... 362/466 |
| 7,083,214 | B2 * | 8/2006 | Hayakawa et al. ...... 296/65.12 |
| 2006/0194604 | A1 * | 8/2006 | Dieringer ............. 455/550.1 |
| 2009/0000839 | A1 * | 1/2009 | Ishii et al. ............ 180/65.5 |

FOREIGN PATENT DOCUMENTS
JP 3481014 10/2003
JP 2005-350014 12/2005
* cited by examiner

*Primary Examiner* — James P Trammell
*Assistant Examiner* — Muhammad Shafi
(74) *Attorney, Agent, or Firm* — Carrier Blackman & Associates, P.C.; Joseph P. Carrier; William D. Blackman

(57) ABSTRACT

A headlight optical axis adjustment apparatus for motorcycle includes an ECU for adjusting an optical axis of a headlight in accordance with a vehicle body attitude. The apparatus includes a center kickstand switch and a side kickstand switch for detecting respective positions of a center kickstand and a side kickstand of the motorcycle. When either of the kickstands is in a deployed position thereof, the ECU is operated to adjust the optical axis of a headlight to a previously set initial direction, regardless of detection outputs from a front vehicle height sensor and a rear vehicle height sensor. The front vehicle height sensor and the rear vehicle height sensor respectively detect the vehicle heights at the front part of the vehicle body and the rear part of the vehicle body. The vehicle heights are represented by compression and decompression amounts of suspensions.

14 Claims, 3 Drawing Sheets

METHOD OF AND APPARATUS FOR ADJUSTING A MOTORCYCLE HEADLIGHT, AND MOTORCYCLE INCORPORATING SAME

CROSS-REFERENCE TO RELATED APPLICATIONS

The present invention claims priority under 35 USC 119 based on Japanese patent application No. 2008-084060, filed on Mar. 27, 2008. The entire subject matter of this priority document, including specification claims and drawings, is incorporated by reference herein.

BACKGROUND OF THE INVENTION

1. Field of the Invention

The present invention relates to an apparatus and a method for adjusting an optical axis of headlight of a motorcycle, and to a motorcycle incorporating same. More particularly, the present invention relates to a motorcycle having a headlight optical axis adjustment apparatus, which is capable of automatically adjusting an optical axis of the headlight of the motorcycle in accordance with an attitude of a vehicle body of the motorcycle.

2. Description of the Background Art

There is a known headlight optical axis adjustment apparatus for a vehicle capable of automatically adjusting an optical axis of a headlight in accordance with a height or forward/rearward inclination of the vehicle. For example, a vehicle disclosed in the Japanese Patent Publication No. 3481014 includes an apparatus for adjusting a height of a seat fixed to the vehicle body frame, and for adjusting the optical axis of the headlight in accordance with the height of the seat.

Further, the Japanese Patent Application Publication No. 2005-350014 discloses a vehicle including a seating sensor and a vehicle height sensor for detecting a change in a height of an axle of a front wheel or a rear wheel of the vehicle. In the vehicle as disclosed in the Japanese Patent Application Publication No. 2005-350014, a vehicle attitude arithmetic unit computes a vehicle attitude based on signals received from the seating sensor and the vehicle height sensor. The vehicle attitude thus computed is used for adjusting an optical axis of the headlight.

When a motorcycle includes a system for automatically adjusting an optical axis in accordance with a height or a forward/rearward inclination of the motorcycle, the following points are required to be taken into consideration. Specifically, a motorcycle is provided with a center kickstand and a side kickstand, and a headlight of the motorcycle is often kept turned on while one of the kickstands is being used (is flipped down).

Here, since the rear wheel is off the ground when the center kickstand is being used, the state of the motorcycle becomes the same as the state in which the vehicle body is inclined in a forward direction, that is, the state in which the front wheel is at a lower position than a position of the rear wheel. Accordingly, in such case, the automatic optical axis adjustment apparatus may possibly be operated so as to change the optical axis of the headlight to be oriented in an upward direction.

On the other hand, when the side kickstand is used, a weight of the motorcycle is supported by three points. Accordingly, the load imposed on the front and rear wheels is reduced. Since a system for detecting vehicle attitude detects a vehicle attitude from compression and decompression conditions of suspension devices of the front and rear wheels, the reduction in the load imposed on the front and rear wheels causes the system to judge that a height of the vehicle is high.

As a result, the automatic optical axis adjustment apparatus may be operated so as to adjust the optical axis of the headlight to be oriented in a downward direction.

The present invention has been made to overcome such drawbacks of the existing headlight optical axis adjustment apparatus for a motorcycle. Accordingly, it is one of the objects of the present invention to solve the aforementioned problems, and to provide a headlight optical axis adjustment apparatus for a motorcycle, which is capable of appropriately adjusting an optical axis of the headlight when a center kickstand or a side kickstand is used.

SUMMARY OF THE INVENTION

In order to achieve the above objects, the present invention according a first aspect of provides an optical axis adjustment apparatus for motorcycle. The apparatus includes a controller for adjusting an optical axis of a headlight so as to be oriented in an upward or downward direction based on a detection output received from a vehicle body attitude detector.

The optical axis adjustment apparatus for motorcycle includes a kickstand position detector for detecting whether or not one of a center kickstand and a side kickstand of the motorcycle is at a retracted position. When the kickstand position detector detects that one of the center kickstand and the side kickstand is not at the retracted position, the optical axis of the headlight is adjusted so as to be oriented in a previously set initial direction, regardless of the detection output received from the vehicle body attitude detector.

Further, the present invention according a second aspect thereof, in addition to the first aspect, is characterized in that the vehicle body attitude detector includes a front vehicle height sensor and a rear vehicle height sensor for detecting vehicle heights at front and rear portions of a vehicle body, respectively; and that vehicle height at front and rear portions of the vehicle body is represented by a compression or decompression amount of a suspension of a corresponding one of the front and rear wheels.

Furthermore, the present invention according to a third aspect thereof, in addition to the first aspect, is characterized in that the vehicle body attitude detector includes a seating switch disposed in or below a seat, or operatively connected with a seat; and that when the seating switch is on, the optical axis is adjusted so as to be oriented in a downward direction as compared with an axis direction set when the seating switch is off.

EFFECTS OF THE INVENTION

In an optical axis adjustment apparatus operable to adjust an optical axis of the headlight in accordance with a vehicle height or a vehicle body attitude, a detection value of the vehicle height or the vehicle body attitude is based on an output received from a vehicle body attitude sensor when the side kickstand or the center kickstand is in use, which is different from a detection value of vehicle height detected when the side kickstand or the center kickstand is not in use.

According to the aforementioned first aspect of the present invention, when the side kickstand or the center kickstand is in a deployed position thereof (when one of the kickstands is not at a retracted position), the optical axis is adjusted so as to be oriented in a previously set initial direction, regardless of the detected output received from the vehicle body attitude sensor.

Therefore, it is possible to prevent the optical axis from being wrongly adjusted in accordance with the detected vehicle height or the vehicle body attitude, and to keep the optical axis to be oriented in a lower direction, which is the previously set initial direction, for example.

According to the second aspect of the present invention, in an optical axis adjustment apparatus configured to detect a forward/rearward inclination attitude of the vehicle body based on each output value received from the front vehicle height sensor and the rear vehicle height sensor, it is possible to avoid an optical axis adjustment error occurring when the rear vehicle height sensor detects a wrong vehicle height since the rear wheel is off of the ground as a result of using the center kickstand.

In addition, it is possible to avoid an optical axis adjustment error due to a reduction in both of the values output received from the front part and rear vehicle height sensors. Since the load on the motorcycle is dispersed to the side kickstand when the side kickstand is in use, such a reduction occurs in the output detected vehicle heights by the front part and rear vehicle height sensors.

According to the third aspect of the present invention, it is possible to prevent an adjustment of an optical axis to be oriented in a desired direction in accordance with a vehicle body attitude detected by the seating switch from not being performed since the side kickstand or the center kickstand is used.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. Also, the directions of front, rear, left, right and the like are the same as those of the vehicle unless otherwise described specifically. It should be understood that these terms are used for purposes of illustration, and are not intended to limit the invention.

Hereinafter, an illustrative embodiment of the present invention with reference to the drawings is described.

Figure 2:
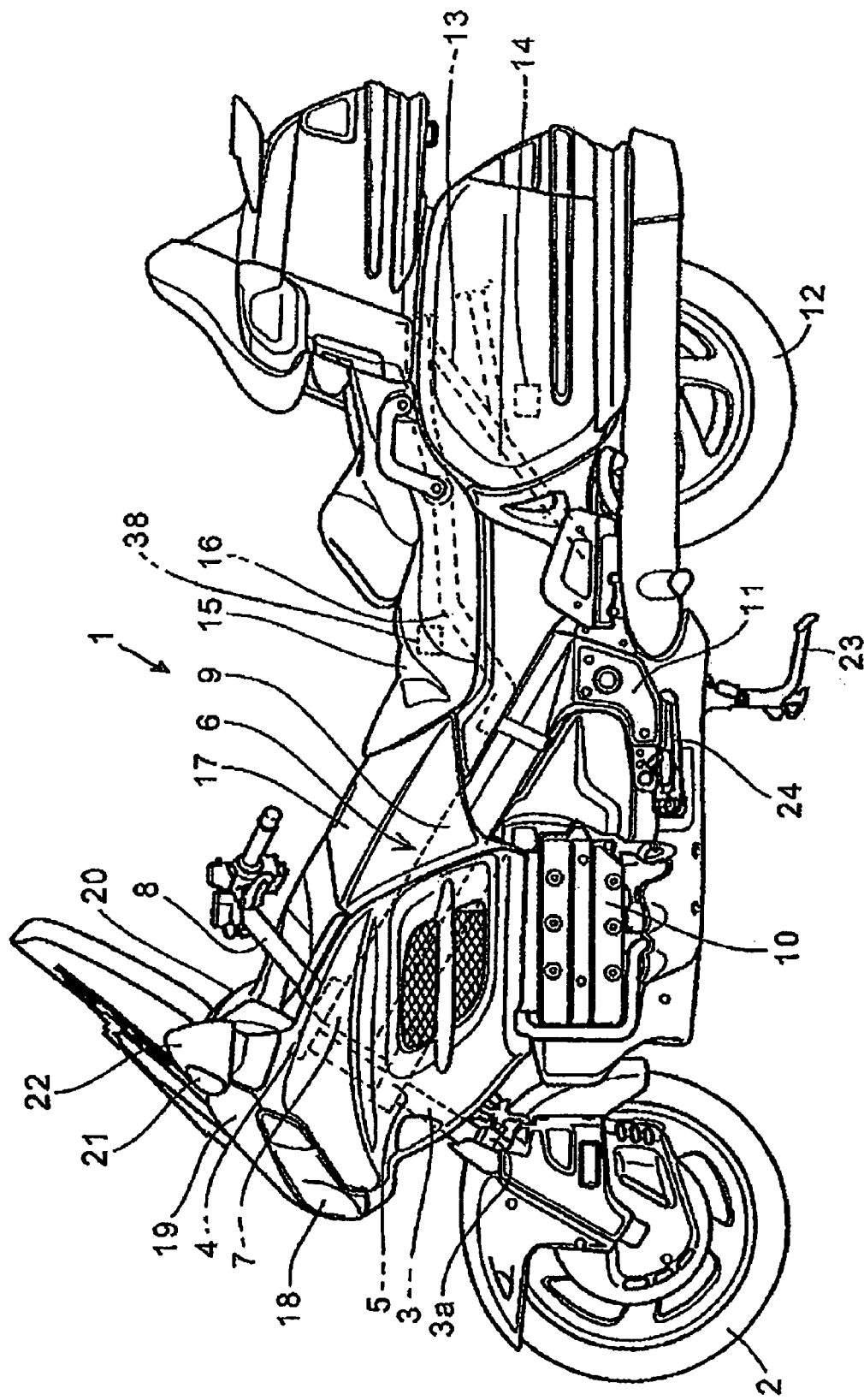
FIG. 2 is a left-side view of a motorcycle including the optical axis adjustment apparatus according to the illustrative embodiment of the present invention.

FIG. 2 is a left-side view of a motorcycle including a headlight optical axis adjustment apparatus according to the illustrative embodiment of the present invention.

As shown in FIG. 2, the motorcycle 1 includes a front wheel 2 pivotally supported by lower end portions of a pair of left and right front forks 3. An upper portion of each of the left and right front forks 3 is steerably pivoted by a head pipe 7 via a top bridge 4 and a steering system 5. The head pipe 7 is a front end portion of a vehicle body frame 6.

A vehicle body attitude detector includes a front vehicle height sensor 35 and a rear vehicle height sensor 14 for detecting vehicle heights at front and rear portions of a vehicle body, respectively; and that vehicle height at front and rear portions of the vehicle body is represented by a compression or decompression amount of a suspension of a corresponding one of front and rear wheels. The front vehicle height sensor 35 is arranged between the steering system 5 and a bottom case 3a of the front fork 3.

A handlebar 8 for steering the front wheel is attached to a top portion of the top bridge 4. A pair of left and right main frames 9 extends rearwardly and obliquely downward from the head pipe 7. In addition, an engine 10, which is the power unit for the motorcycle 1, is disposed below the main frame 9. The engine 10 is a water-cooled 4-stroke, horizontally-opposed 6-cylinder engine.

Front end portions of swing arms (not shown) for pivotally supporting a rear wheel 12 are swingably pivoted to respective pivot plates 11. The pivot plates 11 are formed contiguous to rear end portions of the main frames 9. A rear portion of the swing arm is coupled to a rear frame 13 extending upwardly and rearwardly from the rear end portion of each of the main frames 9 via a link mechanism (not shown) and a rear suspension (not shown).

The rear vehicle height sensor 14 is arranged between the rear frame 13 and the rear suspension. The power of the engine 10 is transmitted to the rear wheel 12 via a drive shaft (not shown) disposed in the swing arm and a gear box (not shown) disposed at a center portion of the rear wheel. A front end portion of a seat frame 16 for supporting a seat 15 for a rider and a passenger is joined to the main frame 9 in vicinity of the pivot plate 11. The seat 15 has a front portion for a rider and a rear portion for a rear-seat passenger.

A fuel tank 17 extending to a lower front portion of the seat 15 is disposed in front of the seat 15. A seating switch 38 is disposed in the seat 15. The seating switch 38 may be disposed below the seat 15. A pressure switch is preferably used as a seating switch 38, for example. Upon detection of a pressure having a value greater than or equal to a predetermined value, the pressure switch determines that a rider or a passenger is sitting on the seat 15.

A front cowl 19 is provided at a front portion of a vehicle body of the motorcycle 1. The front cowl has a large-sized structure, and includes a pair of left and right head lights 18 disposed therein. A meter panel 20 provided with a speed meter, a tachometer and the like, is provided at an upper rear portion of the front cowl 19. Left and right mirrors 22 each including left and right turn signal indicators 21 are provided at both sides of an upper portion of the front cowl 19, respectively.

A retractable main kickstand (center kickstand) 23 for supporting the vehicle body in an upright position is provided in the vicinity of lower end portions of the left and right pivot plates 11 of the main frame 6. The center kickstand 23 is shown in a deployed position thereof in FIG. 2. A retractable side kickstand 24 for supporting the vehicle body in a position in which the vehicle leans towards the left side (position in which an upper portion of the vehicle body is inclined towards the left side of the vehicle body) is provided at a lower front portion of the left pivot plate 11.

A center kickstand switch and a side kickstand switch are arranged at a lower portion of the main frame 9.

As a kickstand position detector, the center kickstand switch outputs a detection signal when the center kickstand is at a retracted position, and a non-detection signal when the center kickstand is not at the retracted position.

As a kickstand position detector, the side kickstand switch likewise outputs a detection signal when the side kickstand is at a retracted position, and a non-detection signal when the side kickstand is not at the retracted position.

Each of the center kickstand switch and the side kickstand switch is preferably a limit switch. Each limit switch outputs a detection signal when an actuator is pressed in response to a state where corresponding one of the center kickstand and the side kickstand is at the retracted position.

Figure 3:
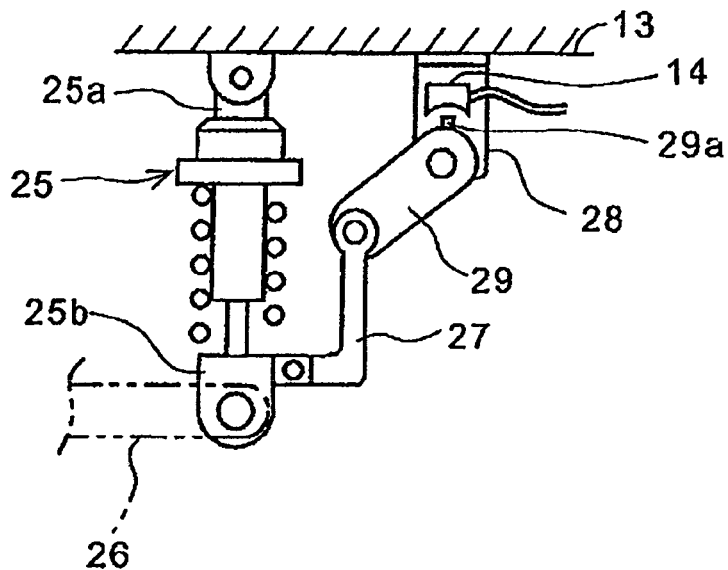
FIG. 3 is a side view showing an example of a rear vehicle height sensor.

FIG. 3 is a diagram showing an example of the rear vehicle height sensor 14. As shown in FIG. 3, an upper end portion 25a of a rear suspension 25 is coupled to the rear frame 13. A lower end portion 25b of the rear suspension 25 is coupled with a link mechanism 26 attached to the swing arm. Accordingly, when the rear suspension 25 is compressed or decompressed depending on the load on the rear frame 13, the distance between the upper end portion 25a and the lower end portion 25b of the rear suspension 25 changes. The vehicle sensor 14 is provided so as to output a detection value corresponding to the change in distance between the upper end portion 25a and the lower end portion 25b of the rear suspension 25.

A first arm 27 is rotatably coupled with the lower end portion 25b of the rear suspension 25. A bracket 28 is fixed to the rear frame 13. The first arm 27 and the bracket 28 are coupled to each other with a second arm 29. The second arm 29 has a concave portion (or a magnet) 29a formed on an upper portion thereof. The vehicle height sensor 14 attached to the bracket 28 is disposed so as to face the concave portion 29a of the second arm 29. The vehicle height sensor 14 is configured of a Hall IC having two Hall elements in a single package.

In the illustrative embodiment of the present invention, the rear suspension 25 is compressed or decompressed when the swing arm moves upward or downward. As a result, the second arm 29 rotates around a portion thereof where the second arm 29 is coupled to the bracket 28 as the center. Along with such movement of the second arm 29, the relative position of the concave portion 29a and the vehicle height sensor 14 changes. The output of the Hall IC forming the vehicle height sensor 14 changes accordingly. The output of the Hall IC corresponds to the amount of compression or decompression of the rear suspension 25, that is, the amount of change in the vehicle height (the upward or downward movement of the rear wheel).

The front vehicle height sensor may be configured in the same manner as that of the rear vehicle height sensor 14. Specifically, a member similar to the first arm 27 is provided to the bottom case 3a of the front fork 3, and a member similar to the bracket 28 is provided to the steering system 5. These two members are coupled to each other by placing a member similar to the second arm 29 therebetween. The Hall IC detects the rotation amount of the member similar to the second arm 29a, and then, the change in the vehicle height (the upward or downward movement of the front wheel) is detected.

Figure 1:
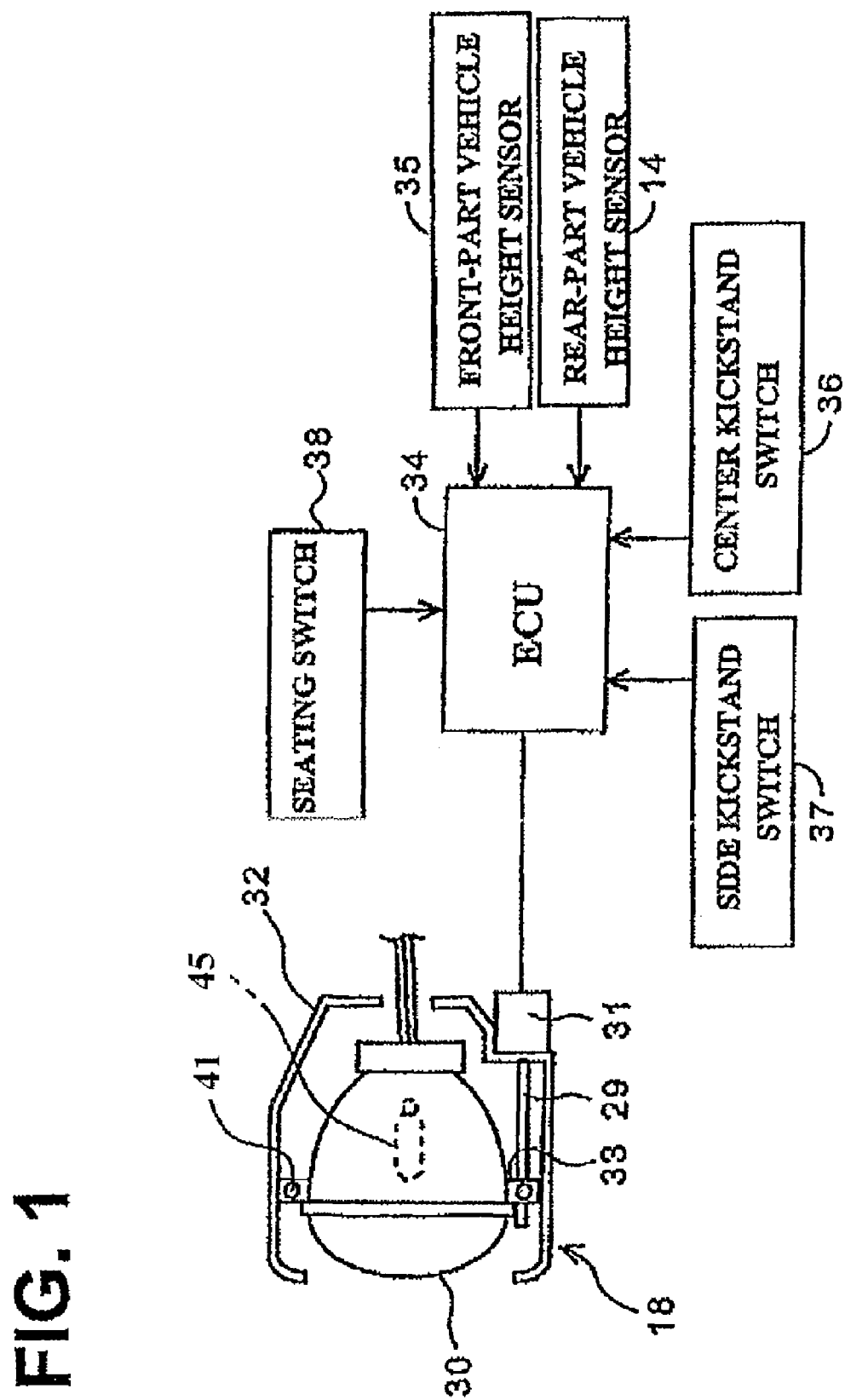
FIG. 1 is a system configuration diagram of an optical axis adjustment apparatus according to an illustrative embodiment of the present invention.

FIG. 1 is a system configuration diagram of an optical axis adjustment apparatus of the motorcycle 1. Although FIG. 1 shows one of the headlights 18 having a single bulb 45 as an example, a system using individual bulbs respectively for high beam and low beam may be employed.

An upper portion of a light body 30 is supported by a pivot 41. The light body 30 is supported in a headlight case 32 so as to be pivotally adjustable with respect thereto. On the other hand, a lower portion of the case 32 is configured such that a threaded adjustment member 29, rotated by an optical axis adjustment motor 31, engages with a screw nut (not shown) supported by a stay 33. The left and right headlights 18 each have a similar configuration.

According to the illustrative embodiment of the present invention, the threaded adjustment member 29 is operated to move forward and rearward with respect to the screw nut by the rotation of the optical adjustment motor 31. The light body 30 thereby swings around the axis 41 as the center. Thus, an optical axis of the headlight is adjusted.

An electronic control unit (ECU) 34 receives detection signals from the front vehicle height sensor 35, the rear vehicle height sensor 14, the center kickstand switch 36, the side kickstand switch 37 and the seating switch 38. The ECU 34 executes a planned program based on each of the detection signals received from the front and rear vehicle height sensors 35, 14, the kickstand switches 36, 37 and the seating switch 38, and inputs calculated forward rotation command or a reverse rotation command to the left and right optical axis adjustment motors 31.

Figure 4:
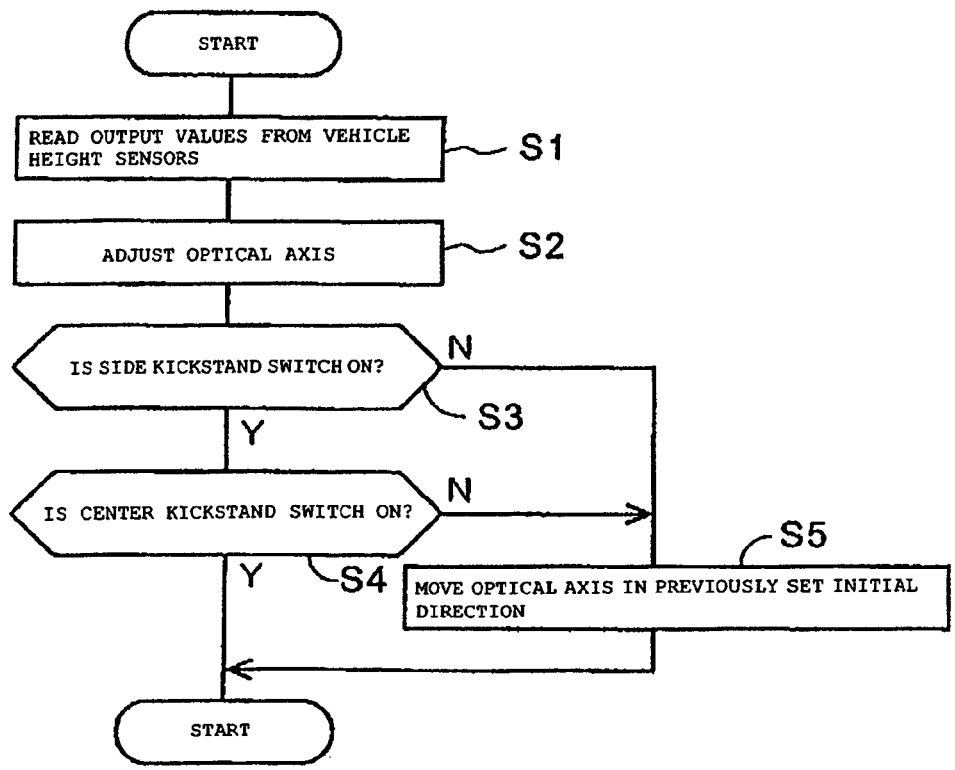
FIG. 4 is a flowchart showing main steps of the operation of an ECU related to an optical axis adjustment processing.

FIG. 4 is a flowchart showing a method of adjusting an optical axis of headlight of a motorcycle. The method steps include processing performed by the ECU 34.

In step S1, the ECU 34 reads output values received from the front vehicle height sensor 35 and the rear vehicle height sensor 14. In step S2, the ECU 34 adjusts an optical axis of the headlight by operating (driving) the optical axis adjustment motors 31 based on the output values received from the front vehicle height sensor 35 and the rear vehicle height sensor 14, to adjust a direction of the light beam from the light body 30 to move upward and downward.

Specifically, the ECU 34 operates the optical axis adjustment motors 31 and 31 to move the direction of their light beams based on the compression or decompression amounts of the front fork 3 and the rear suspension 25, respectively. The compression or decompression amounts of the front fork (front suspension) 3 and the rear suspension 25 are detected by the front vehicle height sensor 35 and the rear vehicle height sensor 14, respectively.

In addition, the ECU 34 is operable to drive the optical axis adjustment motors 31 and 31 to move the direction of their light beams downward when the ECU determines that the rear wheel side of the vehicle body is shifted downward. The driving amount of the optical axis adjustment motors 31 and 31 are previously set in accordance with difference between the output values of the front vehicle height sensor 35 and the rear vehicle height sensor 14. The ECU 34 reads the previously set value of difference between the output values of the front vehicle height sensor 35 and the rear vehicle height sensor 14.

Moreover, it is possible to set the optical axis to move upward in a case where the ECU 34 determines, based on the output values, that the entire vehicle body is shifted downward.

In step S3, determination is made on whether the side kickstand switch 37 is ON or OFF, that is, whether or not the side kickstand 24 is at the retracted position. When it is determined that the side kickstand switch 37 is ON, the processing proceeds to step S4 to determine whether the center kickstand switch 36 is ON or OFF, that is, whether or not the center kickstand 23 is at the retracted position.

When the determinations made in steps 3 and 4 are affirmative (the center and side kickstands are at the retracted positions), the processing returns to step S1. When the determination made in steps 3 or 4 is negative, that is, when one of the side kickstand 24 and the center kickstand 23 is determined to be in a deployed position (i.e., not in the retracted position thereof), the processing proceeds to step S5. In step S5, the optical axis adjustment motors 31 and 31 are operated so as to move the optical axis in a previously set initial direction.

When the side kickstand is at a non-retracted position, that is, when the side kickstand 24 is in use, the vehicle height cannot be correctly detected, since the vehicle body is supported by three points, i.e., the front wheel 2, the rear wheel 12 and the side kickstand 24. Similarly, when the center kickstand 23 is at a non-retracted position, that is, when the center kickstand 23 is in a deployed configuration, the vehicle height cannot be correctly detected either, since the rear wheel 12 is off of the ground.

Accordingly, when either of the kickstands 23, 24 is in a deployed position thereof, regardless of the output values of the side kickstand switch 37 and the center kickstand switch 36, the optical axis is set in the previously set initial direction. The initial direction is preferably set to a lower direction than a normal running direction so that the light will not be too bright when viewed from the front.

It may be noted that FIG. 4 shows the example in which the height of the motorcycle 1 or the attitude of the motorcycle 1 in the forward or rearward direction are detected based on the outputs of the vehicle height sensors provided respectively at the suspensions of the front and rear wheels. The present invention is not limited to this example, but can also be applied to the following case.

Specifically, whether or not the rider or the passenger is sitting on the seat 15 is determined based on a detection output of the seating sensor (seating switch) 38. Based on such determination, the height of the motorcycle 1 or the attitude thereof in the forward or rearward direction is detected.

When the rider or passenger sits on the seat 15, the optical axis is adjusted so as to be oriented in a downward direction since the rear wheel side of the vehicle shifts to a lower position. In the optical axis adjustment apparatus configured in this manner, the optical axis is adjusted to be oriented in a previously set initial direction, regardless of the output of the seating switch 38, when the side kickstand 24 or the center kickstand 23 is in use.

As described above, according to the present embodiment, the optical axis adjustment apparatus includes a sensor system for detecting the height of the vehicle body or the attitude thereof in the forward or rearward direction. Therefore, even in a case where the optical axis is adjusted based on the height of a vehicle or the attitude thereof in the forward or rearward direction, which is detected by the sensor system, the optical axis is set to be oriented in a previously set initial direction if the side kickstand or the center kickstand is in use. Accordingly, it is possible to prevent the headlight from being directed in an undesired direction and/or inclination.

It may be noted that a known sensor or switch in accordance with a type or shape of a vehicle can be used for the vehicle height sensor or the seating switch cited as an example in the illustrative embodiment of the present invention.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. An apparatus for adjusting an optical axis of a headlight on a motorcycle, said apparatus comprising:
    a vehicle body attitude detector, said vehicle body attitude detector includes a front vehicle height sensor and a rear vehicle height sensor for detecting vehicle heights of front and rear portions of a body of the motorcycle, respectively;
    a kickstand position detector for detecting a position of at least one of a center kickstand and a side kickstand of the motorcycle; and
    a controller for receiving input from said detectors, and for adjusting an optical axis of the headlight in an upward or downward direction in accordance with input received from the vehicle body attitude detector; wherein
    when the kickstand position detector detects that one of the center kickstand and the side kickstand is in a deployed position thereof, the controller is operated to adjust the optical axis of the headlight to be oriented in a previously set initial direction, regardless of the detection output received from the vehicle body attitude detector,
    each of the vehicle heights of the front and rear portions of the motorcycle body is represented by a compression or decompression amount of a suspension of a corresponding one of front and rear wheels of the motorcycle,
    the optical axis is moved downward when the controller determines that the rear portion of the motorcycle body is shifted downward,
    the optical axis is moved upward when the controller determines that the entire motorcycle body is shifted downward, and
    the initial direction is set to a direction lower than a normal running direction.

2. The optical axis adjustment apparatus for a motorcycle according to claim 1, wherein
    said vehicle body attitude detector includes a seating switch disposed in a seat; and
    when the seating switch is on, the controller is operated to adjust an optical axis of the headlight in a downward direction as compared to a direction set when the seating switch is off.

3. The optical axis adjustment apparatus for motorcycle according to claim 2, wherein said seating switch comprises a pressure switch.

4. The optical axis adjustment apparatus for motorcycle according to claim 1, wherein said kickstand position detector comprises a center kickstand switch operatively connected with said center kickstand, and a side kickstand switch operatively connected with said side kickstand; and wherein both said center kickstand switch and said side kickstand switch are arranged at a lower portion of a main frame of the motorcycle.

5. The optical axis adjustment apparatus for motorcycle according to claim 1, wherein said front vehicle height sensor is arranged between a steering system and a bottom case of a front fork of the motorcycle; and wherein said rear vehicle height sensor is arranged between a rear frame and a rear suspension of the motorcycle.

6. The optical axis adjustment apparatus for motorcycle according to claim 1, wherein each of said front vehicle height sensor and said rear vehicle height sensor includes a Hall IC having two Hall elements disposed in a single package.

7. The optical axis adjustment apparatus for motorcycle according to claim 1,
    wherein the controller first determines whether the side kickstand is in a retracted position or a non-retracted position and the controller then determines whether the center kickstand is in a retracted position or a non-refracted position.

8. A motorcycle comprising an optical axis adjustment apparatus for adjusting an optical axis of a headlight of said motorcycle, said optical axis adjustment apparatus comprising
 a vehicle body attitude detector for detecting a vehicle attitude at a front and rear portion thereof, said vehicle body attitude detector includes a front vehicle height sensor and a rear vehicle height sensor for detecting vehicle heights of front and rear portions of a body of the motorcycle, respectively;
 a kickstand position detector for detecting a position of at least one of a center kickstand and a side kickstand of the motorcycle; and
 a controller for adjusting an optical axis of the headlight in an upward direction or a downward direction based on a detection signal received from the vehicle body attitude detector;
wherein
when the kickstand position detector detects that one of the center kickstand and the side kickstand is in a deployed position thereof, the controller is operated to adjust the optical axis of the headlight to be oriented in a previously set initial direction, regardless of the detection output received from the vehicle body attitude detector,
each of the vehicle heights of the front and rear portions of the motorcycle body is represented by a compression or decompression amount of a suspension of a corresponding one of front and rear wheels of the motorcycle,
the optical axis is moved downward when the controller determines that the rear portion of the motorcycle body is shifted downward,
the optical axis is moved upward when the controller determines that the entire motorcycle body is shifted downward, and
the initial direction is set to a direction lower than a normal running direction.

9. A motorcycle according to claim 8, wherein said kickstand position detector comprises a center kickstand switch operatively connected with said center kickstand, and a side kickstand switch operatively connected with said side kickstand; and wherein both said center kickstand switch and said a side kickstand switch are arranged at a lower portion of a main frame of the motorcycle.

10. A motorcycle according to claim 8, wherein said front vehicle height sensor is arranged between a steering system and a bottom case of a front fork of the motorcycle; and wherein said rear vehicle height sensor is arranged between a rear frame and a rear suspension of the motorcycle.

11. A motorcycle according to claim 8, wherein each of said front vehicle height sensor and said rear vehicle height sensor includes a Hall IC having two Hall elements disposed in a single package.

12. A motorcycle according to claim 8, wherein
 said vehicle body attitude detector includes a seating switch disposed in a seat of the motorcycle; and
 when the seating switch is on, the controller is operated to adjust an optical axis of the headlight in a downward direction as compared to a direction set when the seating switch is off.

13. A motorcycle according to claim 12, wherein said seating switch comprises a pressure switch.

14. A motorcycle according to claim 8,
 wherein the controller first determines whether the side kickstand is in a retracted position or a non-retracted position and the controller then determines whether the center kickstand is in a retracted position or a non-refracted position.

* * * * *